United States Patent [19]
Goto et al.

[11] Patent Number: 5,332,593
[45] Date of Patent: Jul. 26, 1994

[54] METHOD OF PRODUCING MINCED FISH MEAT

[75] Inventors: Sumito Goto; Fumio Tsujii; Hideki Okada; Takeshi Suzuki, all of Otemachi, Japan

[73] Assignees: Taiyo Fishery Co., ltd., Tokyo; Toyo Suisan Kikai Co., Ltd., Osaka, both of Japan

[21] Appl. No.: 14,452

[22] Filed: Feb. 5, 1993

[30] Foreign Application Priority Data

Feb. 5, 1992 [JP] Japan .................................. 4-056437

[51] Int. Cl.$^5$ .............................................. A23L 1/00
[52] U.S. Cl. .................................. 426/479; 426/518; 426/643
[58] Field of Search ................. 426/479, 480, 518, 643

[56] References Cited

U.S. PATENT DOCUMENTS 3,804,964  4/1974  Hogstedt et al. ..................... 426/479
4,769,256  9/1988  Matsumoto et al. ................. 426/643

Primary Examiner—George Yeung
Attorney, Agent, or Firm—Larson and Taylor

[57] ABSTRACT

A method of effectively producing minced fish meat in a large quantity from fish bodies having hard meat comprising supplying a substantially fixed and large quantity of fish bodies having hard meat to a fish body cutting means for constantly cutting all the fish bodies into a plurality of cut pieces, feeding the cut pieces of the fish bodies to a washing means for removing impurities such as scales, dirts, blood and internal organs, etc. from said cut pieces, crushing said cut pieces by a crusher for softening the fish meat, and then collecting the fish meat by a fish meat collecting means for obtaining the minced fish meat.

8 Claims, 4 Drawing Sheets

METHOD OF PRODUCING MINCED FISH MEAT

BACKGROUND OF THE INVENTION

The present invention relates to a method of producing minced fish meat.

In producing ground or mashed fish meat as a material for sausage, boiled fish plate, etc., there has been used a method in which a use is made of a fish meat collecting means comprising a hollow fish meat collecting roll having a number of fish meat collecting holes in its peripheral wall and pressed against the upper face of a circulating endless rubber belt. The fish meat collecting roll is rotated in synchronism with the running speed of the endless rubber belt and fish meat or flesh (fillet) pieces are supplied onto the endless rubber belt to press the fish meat pieces against the fish meat collecting roll to thereby crush the fish meat pieces and collect the crushed eatable portion of the fish meat pieces (hereinafter referred to as minced fish meat) into the roll through the fish meat collecting holes of the roll for obtaining the mashed fish meat.

With such method, fishes having soft meat, such as mackerel and sardine, may be processed satisfactorily, but it was difficult to collect fish meat from fishes having hard meat, such as flatfishes because such hard meat does not well intrude or encroach into the fish meat collecting roll when fish bodies are pressed between the roll and the rubber belt. Furthermore, it is difficult to fillet the flatfishes by means of a filletting machine due to their shape. Thus, it was quite difficult to produce the minced fish meat from fishes having hard meat, such as flatfishes.

Still further, the fishes as can be processed by said previously known method are not constantly supplied through the year due to their fishery seasons and variations of haul. Thus, it is highly desired to produce minced fish meat which may be used for producing mashed fish meat from fishes which can be constantly supplied through the year, such as flatfishes.

SUMMARY OF THE INVENTION

The present invention relates to a method of producing minced fish meat which overcomes said difficulties of the above described previously known method.

An object of the present invention is to provide a method of producing minced fish meat which is able to effectively produce minced fish meat in a large quantity from fishes, such as flatfishes, having hard meat as well as from normal fishes without the necessity of cutting off the heads or filletting.

The method of producing minced fish meat according to the present invention comprises the steps of cutting fish bodies into a plurality of cut, bone-containing, fish body pieces;

washing said cut pieces to remove therefrom impurities adhered to said cut pieces to provide washed, bone-containing cut fish body pieces;

crushing the washed, cut, bone-containing fish body pieces to break the skin of the cut pieces, to cut or break bones into small pieces, and to soften the fish meat;

feeding the crushed, bone-containing fish meat to a fish meat collecting means comprising a fish meat collection member having a number of fish meat collecting holes in a wall thereof;

pressing the crushed, bone-containing fish meat against the fish meat collecting member to cause fish meat to pass through said fish meat collecting holes; and recovering, as minced fish meat, the fish meat which passes through said fish meat collecting holes.

According to a preferred feature of the present invention, the method of claim 1 further comprises the step of feeding said minced fish meat as collected by said fish meat collecting means into a tank together with a large quantity of water for precipitating and removing impurities such as bones and otoliths contained in the minced fish meat.

When fish bodies having hard meat, such as flatfishes are supplied to the fish body cutting means in a large and substantially fixed quantity, the fish bodies are cut in random round slices regardless of head-tail orientations and dorsum-abdomen orientation of the fish bodies.

The cut pieces of the fish bodies are washed by water and after having impurities such as scales, dirt, blood, internal organs, etc. been removed, are fed constantly to the crusher where the fish meat of the cut pieces is crushed into a softened condition so that it is made easier to collect the fish meat by means of the fish meat collecting means.

In the minced fish meat thus collected, there are contained impurities such as fine bones and otoliths. Thus, the collected minced fish meat is fed to a tank together with a large quantity of water for precipitating and removing the impurities so that high quality minced fish meat may be obtained.

Thus, according to the present invention, it becomes possible, without the necessity of cutting off the head, etc., to effectively produce minced fish meat constantly and in a large quantity from fishes having hard meat and which are difficult to fillet.

Furthermore, according to the present inventions, the fish bodies are randomly cut regardless of head-tail orientation and dorsum-abdomen orientation of the fish bodies so that the fish bodies may be cut very simply and with high efficiency. Simultaneously with the above, the vertebraes are also cut so that a plurality of cut pieces of fish bodies in which meat portions are exposed may be obtained and such cut pieces of fish bodies are constantly fed to the crusher and crushed thereby so that the fish meat is softened.

Still further, in accordance with the present invention, the cut pieces thus crushed by the crusher are fed to the fish meat collecting means so that meat portions of the cut pieces, even their distal portions, may be positively intruded or pushed into the fish meat collecting roll, and, therefore, the fish collecting percentage is substantially increased, resulting in a high yield. Furthermore, a large quantity of fish bodies may be constantly cut in a substantially fixed quantity so that the fish meat may be collected with high efficiency.

Furthermore, in accordance with the present invention, the minced fish meat as collected by the fish meat collecting means is fed into a tank together with a large quantity of water so that impurities such as bones, otoliths, etc. contained in the minced fish meat are precipitated and removed. Thus, it is possible to obtain minced fish meat of high quality with high efficiency.

BRIEF DESCRIPTION OF THE DRAWINGS

The appended drawings show an example of an apparatus as used in practicing the method of the present invention, and wherein.

DESCRIPTION OF THE PREFERRED EMBODIMENT

Figure 1:
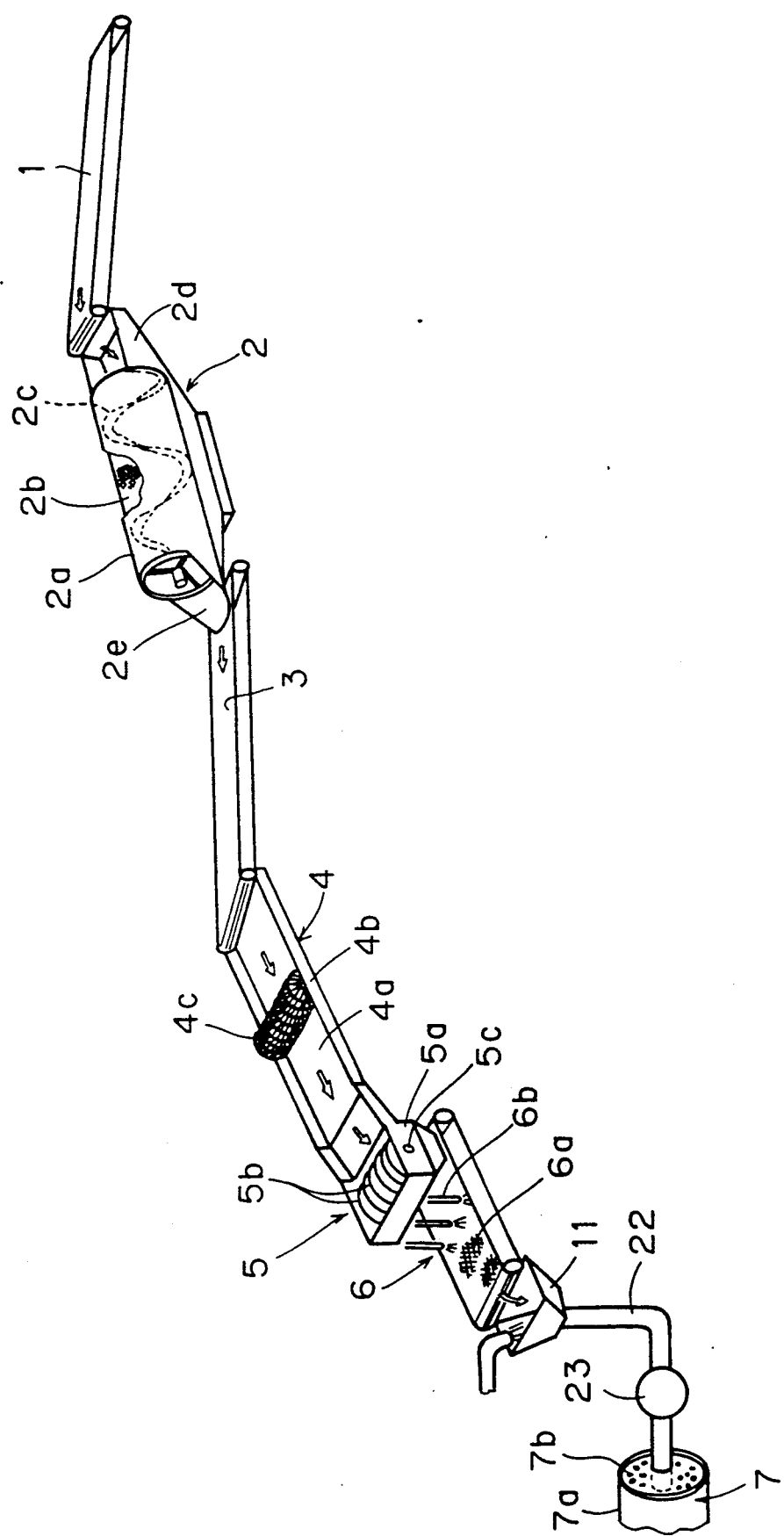
FIG. 1 is a schematical perspective view of a portion of the apparatus for practicing a first part of the method of the present invention.

A large quantity of fish bodies having hard meat such as flatfishes, for instance yellow sole (*Limanda aspera*), are first fed onto transfer starting end of a belt conveyor 1. In succession to transfer terminal end of the belt conveyor 1, there are arranged in series a scale removing means 2, a slat conveyor 3, a fixed quantity feeding means 4, a fish body cutting means 5 comprising a piece cutter, a washing means 6, a first impurity removing means 7, a crusher 8, a fish meat collecting means 9, and a second impurity removing means 10 in this order.

The scale removing means 2 comprises a fixed plain or imperforated cylinder 2a as inclined forwardly downwardly at a suitable angle, a rotary wire net cylinder 2b having a suitable mesh and arranged inside said fixed cylinder 2a, a feed blade 2c fixed spirally on the inner face of the wire net cylinder 2b and a receiver 2d at the rear end arranged in opposition to the transfer terminal end of the belt conveyor 1. Thus, by feeding a large quantity of water into the scale removing means 2 from its rear end, a large quantity of fish bodies fed into said receiver 2d are forcedly moved in the rotary wire net cylinder 2b toward the exit 2e by means of the water flow and the feed blade 2c. During such movements, by means of sliding contacts between the fish bodies and between fish bodies and the rotary wire net cylinder 2b, the scales of the fish bodies are stripped off and dirt adhered to the fish bodies is washed away and downwardly discharged through the meshes of the cylinder 2b and a discharge opening in the bottom portion of the cylinder 2a.

In the illustrated embodiment, the large quantity of fish bodies as discharged from the exit 2e of the scale removing means 2 are fed onto the slat conveyor 3 and then transferred to the fixed quantity feeding means 4. The scale removing means 2 and the slat conveyor 3, however, may be omitted and the fish bodies may be fed directly to the fixed quantity feeding means 4 since the scales and other impurities or dirt can be removed by impurity removing means which will be described hereinafter.

The fixed quantity feeding means 4 comprises a plate 4a inclined forwardly downwardly side wall plates 4b and provided on the opposite edges of the inclined plate 4a, and is adapted to transfer the fish bodies while letting the water flow on the inclined plate 4a as desired or required. The fixed quantity feeding means 4 further comprises in its middle portion a rotary brush 4c rotatively driven by an electric motor (not shown in the drawings) and of which peripheral lower portion is contacted with or positioned in close proximity to the inclined plate 4a. Thus, by rotating the bush 4c, a substantially fixed quantity of fish bodies, depending on the rotational speed of the brush, are constantly fed forwardly through between brush 4c and inclined plate 4a.

In place of the above described fixed quantity feeding means 4 having a rotary brush 4c, other suitable fixed quantity feeding means may be used. For instance, an inclined variable speed slat conveyor having apron plates of a suitable height at a predetermined interval may be used. By using such conveyor, a substantially fixed quantity of fish bodies may be successively received between the adjacent apron plates for being transferred.

A reason for feeding fish bodies in a substantially fixed quantity is to avoid troubles such as clogging of fish bodies in the fish body cutting means 5 and subsequent various means, and, therefore, to insure steady and effective processing in these means.

Figure 3:
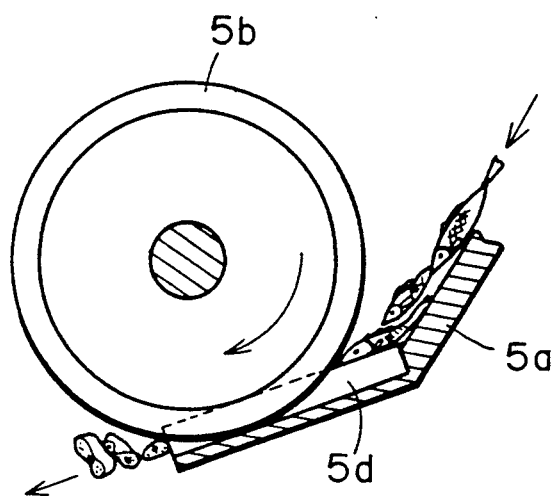
FIG. 3 is a schematical sectional view of a fish body cutting means.

The fish bodies fed out in a substantially fixed quantity from the fixed quantity feeding means 4 are immediately fed to the fish body cutting means 5 constantly and cut into a plurality of pieces. The fish body cutting means 5 comprises a box 5a of which opened rear edge is connected to the lower end edge of the inclined plate 4a of the fixed quantity feeding means 4 and of which bottom portion is opened. The fish body cutting means 5 further comprises a central rotary shaft 5c supported by the opposite side walls of the box 5a and rotatively driven by an electric motor (not shown in the drawings) and a plurality of circular cutter plates 5b fixed on the shaft 5c at a desired small interval (about 2 cm interval). By means of these circular cutter plates 5b, the fish bodies, regardless of their head-tail orientation and dorsum-abdomen orientations, are cut in round slices together with vertebra and other bones. In this construction, in the inner bottom surface of the box 5a there may be formed, as shown in FIG. 3, grooves 5d into which the peripheral edges of the circular cutter plates 5b project so as to cut a fish body into a plurality of pieces between said inner bottom surface and the circular cutter plates 5b. In other construction, a plurality of circular cutter plates 5b may be fixed in parallel on two shafts 5c and 5c arranged before and behind, in such a way that the cutter plates of said two shafts are interlaced one another to cut the fish bodies by means of these cutter blades 5b and 5b.

A large quantity of cut pieces of the fish bodies cut in the fish body cutting means 5 constantly fall through the bottom opening of the box 5a to the washing means 6. The washing means 6 comprises a net conveyor 6a and a shower means 6b. The cut pieces of the fish bodies placed on the net conveyor 6a are conveyed forwardly thereby while water under pressure is sprayed over the cut pieces from above by the shower means 6b so that impurities such as scales, dirt internal organs and fish blood adhered to the cut pieces are washed away.

The impurities adhered to the lower sides or surfaces of the cut pieces contact with the upper face of the net conveyor 6a can not be removed completely with the use of the pressurized water as sprayed from above by the shower means 6b. Thus, after such rough removal of the impurities by means of the shower means 6b, the large quantities of the cut pieces of the fish bodies are fed to the rear end portion of a first impurity removing means 7 from the end portion of the net conveyor 6a through a transfer pipe 22.

Figure 4:
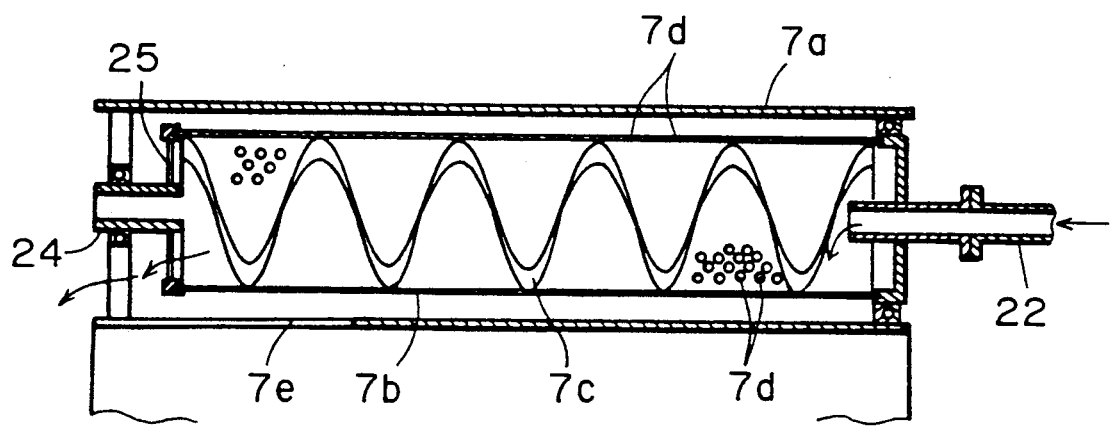
FIG. 4 is a schematical sectional view of a first impurity removing means.

As shown in FIG. 4, the first impurity removing means 7 comprises a fixed plain or imperforate cylinder 7a, a perforated cylinder 7b which has a diameter that is a little smaller than that of fixed cylinder 7a and has in its peripheral wall a number of water passing holes 7d of a diameter of 10~30 mm and rotatably mounted in the fixed cylinder 7a and a spiral agitating blade 7c integrally secured to the inner surface of the perforated cylinder 7b. The forward open end of the transfer pipe 22 penetrates the center of the rear end of the perforated cylinder 7b. A pump 23 is inserted in the transfer pipe 22 to transfer into the perforated cylinder 7b the cut pieces of the fish bodies fed from a hopper 11 together with a large quantity of water.

Figure 2:
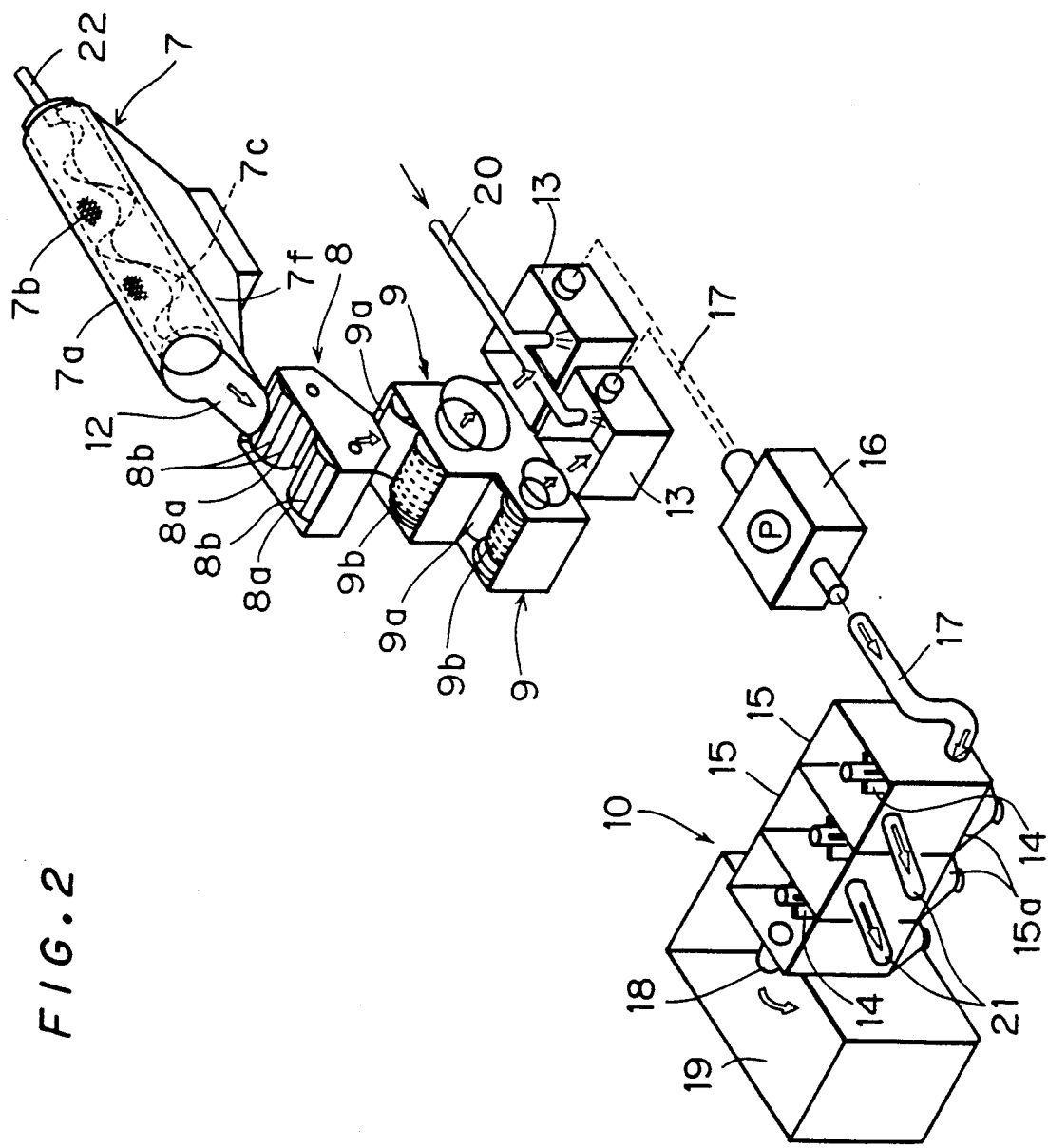
FIG. 2 is a schematical perspective view of another portion of the apparatus for practicing a second part of the method of the present invention.

A rotary shaft 24 rotatively driven by means of an electric motor (not shown in the drawings) is integrally secured to the center of the forward opening of the perforated cylinder 7b through several support frames 25. Rear peripheral surface of the perforated cylinder 7b is rotatably supported from the fixed cylinder 7a through a bearing. An opening 7e is formed in the bottom portion of the forward periphery of the fixed cylinder 7a and as shown in FIG. 2 a peripheral edge of an upper opening of a water storage tank 7f is integrally secured to the edge of the opening 7e for precipitating and separating the impurities in the tank 7f.

When a substantially fixed quantity of cut pieces of the fish bodies are constantly fed from the hopper 11 to the perforated cylinder 7b of the first impurity removing means 7 through the transfer pipe 22 while a large quantity of water being supplied through the hopper 11, the cut pieces of the fish bodies are agitated by means of the spiral agitating blade 7c and surface from and sink into the water flowing on the bottom portion of the fixed cylinder 7a so that the entire cut pieces are uniformly and forcedly washed. Thus, the impurities such as scales, dirt like dust, and internal organs adhered to the cut pieces and blood in the cut pieces are separated therefrom and discharged to the water storage tank 7f through the water passing holes 7d in the perforated cylinder 7b and said opening 7e.

The cut pieces of the fish bodies, after the impurities having been removed therefrom, are constantly fed in a substantially fixed quantity into the crusher 8 through a chute 12 by being propelled forwardly by the rotation of the spiral agitating blade 7c.

Figure 5:
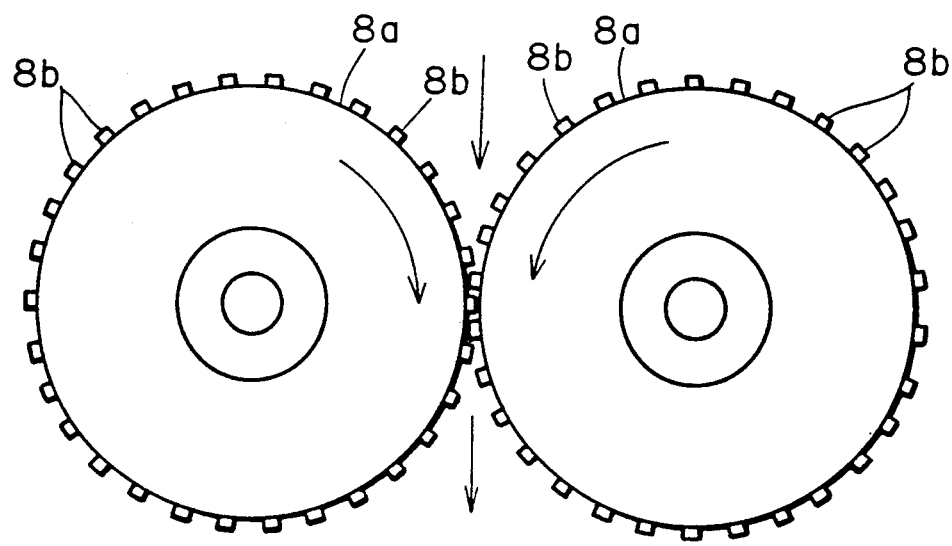
FIG. 5 is a schematical sectional view of a crusher.

The crusher 8, as shown in FIG. 5, comprises a pair of rolls 8a and 8a each having ribs 8b of a suitable height and square cross-section on its peripheral surface at a small interval in the circumferential direction. These rolls 8a and 8a are arranged in opposition one another in such a way that the ribs 8b of one roll 8a are positioned between the ribs 8b of the other roll 8a. The rolls 8a and 8a are rotated in the direction shown by the arrows.

The cut pieces of the fish bodies, when fed between the rolls 8a and 8a, intrude or encroach between the rolls 8a and 8a and are pushed out downwardly. During this step, the peripheral surfaces of the rolls 8a and 8a press the cut pieces and the ribs 8b and 8b thrust into the forward and rear sides of the cut pieces. Thus, the skin of the cut pieces is broken, bones are cut or broken into small pieces and the fish meat is crushed into a softened condition. Such function may be also obtained by securing on the peripheral surface of the roll 8a a number of projections of a suitable height in place of the ribs 8b.

The cut pieces of the fish bodies, after having been crushed in this way, are fed to the fish meat collecting means 9 by being pushed out downwardly by the rotation of the rolls 8a and 8a. The fish meat collecting means 9 comprises a rubber belt 9a circulated in a closed loop and a hollow fish meat collecting roll 9b having a number of fish meat collecting holes in its peripheral wall. The fish meat collecting roll 9b is contacted under pressure with the upper surface of the rubber belt 9a in its suitable portion and is rotated in synchronism with the running of the rubber belt 9a.

When the cut pieces of the fish bodies are constantly fed in a substantially fixed quantity onto the rubber belt 9a of the fish meat collecting means 9, the cut pieces are transferred toward the fish meat collecting roll 9b by the running of the rubber belt 9a and pressed between the fish meat collecting roll 9b and the rubber belt 9a. At this time, the fish meat, while being crushed by the pressure exerted by the fish meat collecting roll 9b, is collected as the minced fish meat into the fish meat collecting roll 9b through fish meat collecting holes of the roll 9b.

On the other hand, skin and large bone pieces adhere to the collecting roll 9b and are moved away from the rubber belt 9a by the rotation of the fish meat collecting roll 9b and then scraped by means of a scraper which has its tip end contacted with the fish meat collecting roll 9b. The scrapped skin and large bone pieces fall on the portion of the rubber belt 9a which has passed the fish meat collecting roll 9b and are discharged from the transfer terminal end of the rubber belt 9a.

Figure 6:
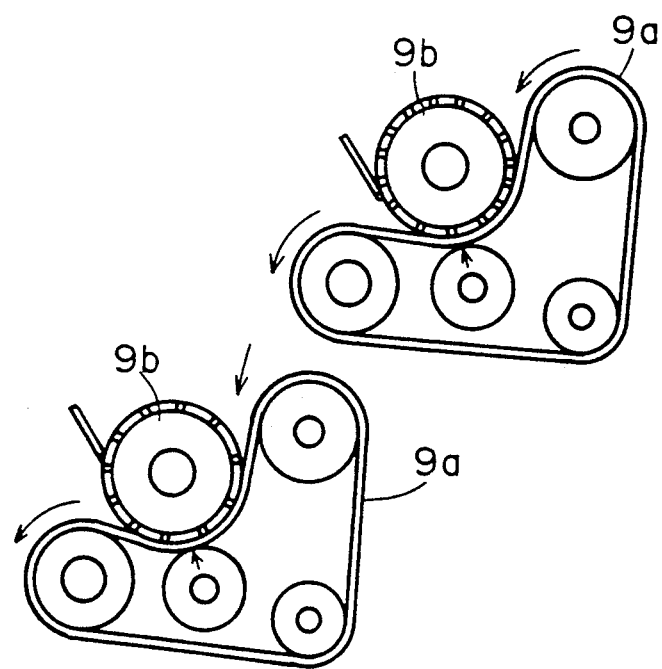
FIG. 6 is a schematical sectional view of a fish meat collecting means.

As shown in FIG. 6, such fish meat collecting means 9 may be arranged in two stages in such a way that after having collected fish meat by the first fish meat collecting means 9, the remaining cut pieces of fish bodies fall from the transfer terminal end of the rubber belt 9a of the first fish meat collecting means 9 onto the rubber belt of the next (second) fish meat collecting means so as to further collect fish meat still adhered to the skin, etc. With this arrangement, fish meat collecting efficiency or percentage and yield may be increased.

As the fish meat collecting roll 9b rotates, the minced fish meat collected by the fish meat collecting means 9 is automatically discharged from an opening at one end of the collecting roll 9b into minced fish meat container 13 and contained therein.

As described above, in accordance with the present invention, minced fish meat is produced from fish bodies having hard meat such as flatfishes. In the minced fish meat discharged from the fish meat collecting means 9, there are contained fine bone pieces and otholiths, etc. and it is desirable to remove them from the minced fish meat. Said second impurity removing means 10 is used to continuously effect such removal from a large quantity of minced fish meat.

The second impurity removing means 10, as schematically shown in FIG. 2, comprises several impurity separating tanks 15 arranged side by side. The impurity separating tanks 15 each comprises a precipitation tank 15a of which the bottom portion is inversely conically shaped and a rotary agitating blade 14 is arranged in the precipitation tank 15a. The upper and lower portions of adjacent separating tanks 15 and 15 are communicated to one another by means of an intermediate pipe 21 and the lower portion of the separating tank 15 at one end is communicated with the upper portion of the minced fish meat container 13 by means of a pipe 17 in which a pump 16 is provided. From the upper portion of the separating tank 15 at the other end, there is projected a discharge pipe 18 which is arranged in the upper opening portion of the minced fish meat collecting tank 19. Furthermore, a water supply pipe 20 is provided to supply water to the minced fish meat container 13.

When water is supplied to the minced fish meat container 13 through the water supply pipe 20, the water is filled in the container 13 and flows toward pipe 17. The water flowed into the pipe 17 by the suction of the pump 16 is fed into the impurity separating tank 15 at said one end. In this time, the minced fish meat contained in the container 13 is entrained by the water flow and transferred from the container 13 into the impurity separating tank 15 through the pipe 17.

The water which has transferred the minced fish meat into the impurity separating tanks 15 is filled therein so that the minced fish meat is agitated by the rotation of the agitating blade 14. Thus, the minced fish meat separates or swells into fibrous pieces and the impurities such as fine bone pieces and otoliths, etc. which still remain in the minced fish meat are separated therefrom and precipitate into the precipitation tanks 15a. On the other hand, the water containing the minced fish meat successively flows while being agitated by the agitating blades 14 into the separating tanks 15 of the same construction through the intermediate pipes 21 and the impurities remaining in the minced fish meat are separated therefrom in each separating tank 15 in the manner as described above.

In this way, the impurities adhered to or contained in the minced fish meat are separated in a plurality of separating tanks 15 and the minced fish meat is discharged together with water from the separating tank 15 at said other end into the minced fish meat collecting container 19 through the discharge pipe 18. Thus, minced fish meat of high quality is obtained by discharging only water from the container 19.

On the other hand, the impurities precipitated in the precipitation tanks 15a are discharged outside by automatically and periodically opening normally-closed lower openings of the precipitation tanks 15a.

While the present invention has been described above with reference to a preferred embodiment, the embodiment is given for illustrative purposes only. Accordingly, the present invention is not limited to the embodiment but can be modified variously within the scope of the invention as defined in the appended claims.

What is claimed is:

1. A method of producing minced fish meat comprising the steps of:
    cutting fish bodies into a plurality of cut, bone-containing, fish body pieces;
    washing said cut pieces to remove therefrom impurities adhered to said cut pieces to provide washed, bone-containing cut fish body pieces;
    crushing the washed, cut, bone-containing fish body pieces to break the skin of the cut pieces, to cut or break bones into small pieces, and to soften the fish meat;
    feeding the crushed, bone-containing fish meat to a fish meat collecting means comprising a fish meat collection member having a number of fish meat collecting holes in a wall thereof;
    pressing the crushed, bone-containing fish meat against the fish meat collecting member to cause fish meat to pass through said fish meat collecting holes; and
    recovering, as minced fish meat, the fish meat which passes through said fish meat collecting holes.

2. A method as claimed in claim 1 further comprising the step of feeding said minced fish meat into a tank together with a large quantity of water to precipitate and separate bones and otoliths contained in the minced fish meat, and separating the precipitated bones and otoliths from the minced fish meat.

3. A method as claimed in claim 1 wherein said cutting comprises supplying the fish bodies to a fish body cutting means in a substantially fixed rate.

4. A method as claimed in claim 3 further comprising the step of removing scales from fish bodies before said step of cutting the fish bodies.

5. A method as claimed in claim 1 wherein the fish is of a type having fish meat that is characterized as being hard and not soft.

6. A method as claimed in claim 5 wherein the fish comprise flatfish.

7. A method as claimed in claim 6 wherein said flatfish comprise yellow sole.

8. A method as claimed in claim 1 wherein the step of crushing is effected by crushing the washed, cut fish bodies between a pair of rolls.

* * * * *